US005777022A

United States Patent [19]
Bugajski et al.

[11] Patent Number: 5,777,022
[45] Date of Patent: Jul. 7, 1998

[54] ONE-COAT, WATERBORNE COATING SYSTEM FOR UNTREATED POLYPROPYLENE-BASED SUBSTRATES

[75] Inventors: James Bugajski, Crete; Robert Kooy, Lansing, both of Ill.; Raymond J. Moeller, Cedar Lake, Ind.; Michael L. Jackson, LaGrange, Ill.

[73] Assignee: Bee Chemical Company, Lansing, Ill.

[21] Appl. No.: 648,783

[22] Filed: May 16, 1996

[51] Int. Cl.$^6$ .............. C08L 27/00; C08F 8/32; C08C 19/22

[52] U.S. Cl. .......... 524/527; 524/195; 524/556; 525/374; 525/375

[58] Field of Search ............ 524/527, 556, 524/195; 525/374, 375

[56] References Cited

U.S. PATENT DOCUMENTS

| | | | |
|---|---|---|---|
| 3,919,153 | 11/1975 | Fischer | 524/512 |
| 4,055,530 | 10/1977 | Poppe et al. | 524/522 |
| 4,539,360 | 9/1985 | Cowles | 524/441 |
| 5,102,946 | 4/1992 | Chen et al. | 524/527 |
| 5,169,888 | 12/1992 | Sales | 524/267 |
| 5,221,584 | 6/1993 | Nickle et al. | 428/515 |
| 5,256,724 | 10/1993 | Biale | 524/556 |
| 5,258,444 | 11/1993 | Zezinka et al. | 524/507 |
| 5,288,780 | 2/1994 | Jarzombek et al. | 524/127 |
| 5,319,019 | 6/1994 | Nothnagel | 524/556 |
| 5,319,032 | 6/1994 | Martz et al. | 525/301 |
| 5,340,870 | 8/1994 | Clinnin et al. | 524/522 |
| 5,349,022 | 9/1994 | Ashihara et al. | 524/414 |
| 5,356,988 | 10/1994 | Nothnagel | 524/556 |
| 5,380,771 | 1/1995 | Nothnagel | 523/339 |
| 5,397,602 | 3/1995 | Martz et al. | 427/343.5 |
| 5,425,926 | 6/1995 | Kunikiyo et al. | 427/393.5 |

FOREIGN PATENT DOCUMENTS

| | | |
|---|---|---|
| 256540 | 2/1988 | European Pat. Off. |
| WOA9303104 | 1/1993 | WIPO |
| WOA9428077 | 12/1994 | WIPO |

*Primary Examiner*—Tae Yoon
*Attorney, Agent, or Firm*—Wayne E. Nacker; Gerald K. White

[57] ABSTRACT

A one-coat, waterborne coating system for a polypropylene substrate comprises a mixture of an an acid functional acrylic resin latex, a latex of chlorinated polyolefin resin, and a cross-linking agent reactive with the acid functionality of the acrylic resin.

5 Claims, No Drawings

ONE-COAT, WATERBORNE COATING SYSTEM FOR UNTREATED POLYPROPYLENE-BASED SUBSTRATES

The present invention is directed to a one-coat paint for coating polypropylene and polypropylene-based substrates, especially such substrates used as automotive interior parts.

BACKGROUND OF THE INVENTION

It is well known that polypropylene substrates and propylene-based substrates, such as glass-filled polypropylene and rubber-filled polypropylene, are difficult to coat; that is, it is difficult to provide a paint or coating with sufficient adherence to polypropylene-based substrates. As a means of adhering coatings to polypropylene, it is known to apply a primer coat to polypropylene-based substrates with a primer based on chlorinated polyolefin, particularly chlorinated polypropylene.

Recently, water-borne chlorinated polyolefin compositions have been developed which are useful as primers for coating polypropylene-based substrates Example of such water-borne chlorinated polyolefin compositions are found in U.S. Pat. Nos. 5,427,856 and 5,198,485, the teachings of each of which are incorporated herein by reference. Providing a water-borne chlorinated polyolefin composition suitable as a primer is also taught in "Water-Reducible Adhesion Promoters for Coatings on Polypropylene-Based Substrates", Jonathan Lawniczak et al., Eastman Chemical Company, Presented at the Water-Borne, Higher-Solids and Powder Coating Symposium, 26–28 Feb. 1992, New Orleans, La. and in PCT applications WO 93/03085, WO 90/12656, WO 93/01244, and WO 93/03104. Such chlorinated polyolefins may also be imidized, as taught in above-referenced U.S. Pat. No. 5,198,485. Chlorinated polyolefins may also be grafted with an unsaturated monomer having carboxylic acid or carboxylic acid anhydride functionality, e.g., maleic anhydride, as taught by S. B. Fry et al., "Development of a New Adhesion Promoter for Coating Thermoplastic Polyolefin", *Automotive Coatings* 180 n. 4274, Dec. 12, 1990.

Water-borne chlorinated polyolefin compositions are commercially available, e.g., as sold by Eastman Kodak Co. under trade names Eastman CP310W, Eastman CP347W and Eastman CP349W.

While chlorinated polyolefin compositions, including water-borne polyolefin compositions, have good adhesion to polypropylene-based substrates, such compositions generally have poor physical characteristics. Consequently, chlorinated polyolefin compositions are generally suitable only as primers, and are generally described and provided as such.

To cover a polypropylene-based substrate, therefore, it is necessary to coat the primed polypropylene-based substrate with a further paint or coating, such as an acrylic emulsion-based coating.

SUMMARY OF THE INVENTION

In accordance with the invention there is provided a coating for a polypropylene-based substrate comprising a mixture of A) a water-borne chlorinated polyolefin composition and B) an acrylic resin latex having carboxylic acid functionality so as to provide an acid number between about 10 and about 250 and a glass transition temperature ($T_g$) of at least about 10° C., said mixture comprising between about 35 and about 65 wt % of chlorinated polyolefin resin content of A) and between about 35 and about 65 wt % of acrylic resin content of B) based on total weight of chlorinated polyolefin resin content of A) and acrylic resin content of B). The coating compositions contains between about 0.01 and about 5 phr of a cross-linking agent C), reactive with the carboxylic acid functionality of the acrylic resin of B). For film-forming purposes, the composition contains D), between about 3 and about 25 phr of a volatile organic component, e.g., solvents, such as butyl cellosolve and methyl pyrrolidine. The coating composition may be unpigmented or may contain up to about 100 phr, preferably between about 10 and about 80 phr, pigment. The coating composition is applied to a solid, non-porous, non-woven, polypropylene-based substrate, dried and heated to at least about 50° C. up to about 95° C. for a time sufficient to promote adherence to the polypropylene-based substrate.

DETAILED DESCRIPTION OF CERTAIN PREFERRED EMBODIMENTS

Herein, unless otherwise noted, the resin content is defined as the total resin content including the chlorinated polyolefin resin content of the water-borne chlorinated polyolefin composition A) and the acrylic resin content of the water-borne acrylic resin composition B). Other components, such as the cross-linking agent C), the volatile organic component D), pigments, etc. are defined as parts per hundred resin by weight (phr) based on total resin content.

By polypropylene-based substrate is meant a substrate comprising at least about 50% by weight of a resin which is a propylene homopolymer or a copolymer in which at least 60% by weight of the monomer content is propylene.

The chlorinated polyolefins useful in this invention can be broadly described as a chlorinated polyolefin having a molecular weight (weight average) in the range of 9000 to 150,000, a softening point in the range of 75° to 115° C., and an amount of chlorine in the range of 15 to 35 wt percent, based on the weight of the polyolefin. Chlorinated polyolefins useful in this invention are disclosed in U.S. Pat. No. 3,579,485, the teachings of which is incorporated herein by reference. Chlorinated polyolefins useful in the invention may be unmodified or further modified, e.g., by grafting of an imide or with a monomer containing a carboxylic acid group or carboxylic acid anhydride group, e.g., maleic anhydride. If further modified with an imide, the imide may be present at between about 0.001 and about 10 wt % based on the weight of the polyolefin. If further modified with a monomer containing a carboxylic acid group or carboxylic acid anhydride group, the monomer may be present at between about 0.001 and about 10 wt % based on the weight of the polyolefin.

Preferably, for bonding to a polypropylene-based substrate, the polyolefin which is chlorinated or otherwise modified is a propylene homopolymer or a propylene copolymer in which at least about 60 wt % of the monomer content is propylene.

The chlorinated polyolefin resin is dispersed as particles in water in a conventional manner using surfactants and/or amines as described in the above-referenced patents and other above-described references. It is most convenient to use a commercial chlorinated polyolefin dispersion, such as those mentioned above. Typically, water-borne chlorinated polyolefin resin compositions A) are used at solids contents of between about 15 and about 35 wt %.

The acrylic resins used to form the water-borne acrylic compositions B) are addition products which are addition polymers that are the reaction of acrylic monomers which may be selected from a large number of acrylic and methacrylic acids and esters along with suitable copolymerizable monomers. Examples of acids and esters which can be used include, but are not limited to acrylic acid, methacrylic acid, methyl methacrylate, ethyl acrylate, butyl acrylate, methyl acrylate, ethyl methacrylate, butyl methacrylate, 2-hydroxy ethyl acrylate, 2-hydroxyethylmethacrylate,propyl methacrylate, lauryl methacrylate, 2-hydroxy propyl methacrylate, 2-ethyl hexyl methacrylate, hexyl methacrylate, cyclohexyl methacrylate, ethoxyethyl acrylate, cyclohexyl acrylate, hexyl acrylate, and 2-hydroxy propyl acrylate. Some example of suitable co-polymerizeable monomers include styrene, α-methyl styrene, vinyl toluene, vinyl pyrrolidine, acrylonitrile, butadiene, and isoprene.

The water-borne acrylic emulsions of the present invention may be prepared by conventional means as are known in the art, e.g., by free-radical initiated emulsion polymerization in an aqueous medium or by solution polymerization followed by dispersion in an aqueous medium by neutralization, use of surfactants, use of thickeners or combinations thereof. The acrylic resins of the water-borne acrylic composition B) may be homogeneous, or may be formed by a core and shell technique, as taught in U.S. Pat. No. 5,340,870, the teachings of which are incorporated herein by reference. Other examples of preparation of water-borne acrylic compositions B) (latexes) are found, for example in U.S. Pat. Nos. 4,826,631, 3,666,704, 4,179,414, 4,226,752, 4,426,482, 4,539,361, 4,546,160, and 4,668,730, the teachings of each of which are incorporated herein by reference. Water-borne acrylic resin compositions are typically used at solids levels of between about 30 and about 70 wt %.

For forming a permanent coating with physical properties, particularly resistance to cleaning solutions, such as Windex®, alcohol, isopropyl alchol, etc., required for interior automotive parts, it is necessary that the acrylic resin of the water-borne acrylic composition B) have a glass transition temperature ($T_g$) of at least about 10° C., preferably at least about 15° C. So as not to form a coating that is too brittle, the $T_g$ of the acrylic latex is generally below about 150° C. and more typically below about 80° C. The acrylic resin may have no carboxylic acid functionality. However, preferably the acrylic resin has an acid number of at least 10, more preferably at least 50, up to about 250. If present the acid functionality may neutralized with a base, such as ammonia or an amine, to promote dispersibility of the acrylic resin in aqueous medium. Also, carboxylic acid provides a means by which the acrylic resin may be cross-linked by addition of a suitable cross-linking agent C). Some acid-functional cross-linking agents include, but are not limited to carbodiimide, aziridine, oxazoline-functional polymer emulsion, such as sold as Epocros® K-1000 series, zinc oxide, water dispersed polyisocyanates, salts of multivalent metal ions, and melamine formaldehydes.

Other functional groups provided by selection of appropriate monomer content may also provide basis for cross-linking the acrylic resin, if desired. For example, –OH functionality, as provided by hydroxy ethyl acrylate or methacrylate, may be cross-linked with water dispersed polyisocyanates, salts of multivalent metal ions and melamine formaldehydes.

A volatile organic component D) is necessary for film-forming, and is provided at at least about 3% phr, up to about 25 phr. Desirably, from the standpoint of providing a coating composition with low VOC's, the volatile organic component D) is present at no greater than 15 phr. Preferably, the solvent range is 5–15 phr, most preferably 8–12 phr. Component D) evaporates from the coating composition during drying, particularly when the coating composition is baked onto the substrate.

The volatile organic component D) is to be distinguished from plasticizers which remain with the composition as a coating on a substrate. To achieve a one-coat coating with physical properties considered acceptable for interior automotive applications, the composition is substantially non-plasticized. By non-plasticized is meant herein a composition containing no more than about 1 phr, and the composition preferably contains no plasticizer which remains with the coating on the substrate.

The water-borne chlorinated polyolefin composition A) and the water-borne acrylic composition B) are conveniently prepared separately. In general practice, in fact, each of latex compositions A) and B) are commercially available and may be purchased as separate water-borne latexes. The composition may be prepared merely by mixing compositions A), B), C) and D). Conventional additives, such as additional surfactants, defoamers, flow control agents, thickeners, UV-stabilizers, pigments, etc, may also be added. Typically, water-borne compositions in accordance with the invention are prepared at solids levels of between about 25 and about 60%.

The coating composition is coated by conventional means onto a polypropylene-based substrate and allowed to dry. The coating compositions are most useful for coating parts which are solid, non-porous, non-woven monolithic structures. Such structures may be formed in conventional manner, e.g., casting, molding, extrusion, etc. For good adherence, it is found necessary to bake the coating onto the substrate at at least about 50° C. A typical bake cycle is at 82° C. for 30 minutes. It is believed that during the bake, a surface interaction takes place between the coating and the substrate, forming a strong adhesive bond. If a cross-linking system is provided, significant curing takes place during the bake cycle.

The invention will now be described in greater detail by way of specific examples.

EXAMPLES 1 and 2

Lapis Blue (Ex. 1) and Saddle (Ex. 2) paints were formulated as follows. (Examples 1 and 2 are expressed as formula weight percent. The weight percentages listed in the table below are expressed as percentages of total composition weight and the weight percentages of water-borne components include water, etc. The solids of the chlorinated polyolefin resin emulsion and the acrylic emulsions are provided in the formulations at equal weight percents.)

| Component | Description | Ex. 1 | Ex. 2 |
|---|---|---|---|
| Eastman CP310W | Chlorinated polyolefin resin emulsion | 29.98 | 28.52 |
| Water | | 3.32 | 3.15 |
| Carboset® XPD-1324 (B. F. Goodrich) | Acrylic emulsion | 14.14 | 13.44 |
| Hycar® 26-172 (B. F. Goodrich) | Acrylic emulsion | 4.72 | 4.79 |
| N-methyl-2-pyrrolindone | | 13.97 | 13.28 |
| Petrolite ® 75 | Wax emulsion | 2.97 | 2.82 |
| Mineral Spirits | | 0.30 | 0.28 |
| Barium meta borate | | 0.45 | 0.42 |
| Tinuvin ® 1130 (Ciba-Geigy) | UV-absorber | 0.44 | 0.42 |
| Tinuvin ® 292 (Ciba-Geigy) | Hindered amine light stabilizer | 0.30 | 0.28 |

-continued

| Component | Description | Ex. 1 | Ex. 2 |
|---|---|---|---|
| Viscoset ® 20 | Alkali-swellable thickener | 1.48 | 1.41 |
| Acrysol ® RM-825 (Rohm & Haas) | Associated Thickener | 2.15 | 2.04 |
| Epocros ® K-1020E | Acid-reactive cross-linker | 3.94 | 3.75 |
| MPP620VF (T. H. Hilson) | Wax | 0.64 | 0.62 |
| Silcron ® G601 (SCM) | Flattener | 3.33 | 1.86 |
| Patco ® 519 (American Ingredients) | Silicone defoamer | 0.02 | 0.02 |
| Pigment Mixture | | 17.85 | 23.20 |

All of the above-ingredients were added and mixed under agitation. Each formulation was thinned with water up to 15% to a desired spraying viscosity. The thinned formulations were sprayed via compressed air using a suction-type spray gun onto untreated glass-filled polypropylene (Azdel™) substrates. The painted substrates were flashed at room temperature for 30 minutes and baked for 60 minutes at 90° C. After baking, the painted substrates were removed from the oven and conditioned at room temperature for three days.

EXAMPLES 3 and 4

Medium Graphite (Ex. 3) and Willow (Ex. 4) paints were formulated and prepared substantially as Examples 1 and 2 but with different pigment mixtures. Coating was also as per Example 1.

Coated panels of each of the four colors were tested according to Ford Motor Company published specifications for interior coatings. Results are as follows:

TEST RESULTS PROM WSB-M62J28-A:

| | | |
|---|---|---|
| 3.8.1 | FILM THICKNESS (FLTM BI 12-1) Dry film thickness ranged from 0.8 to 1.2 mils (18 to 30 micrometers). | |
| 3.8.2 | ADHESION (FLTM BI 106-1, Method B) Rated grade 0 using 3M #898-2 tape for all colors. | PASS |
| 3.8.3 | WATER IMMERSION-96 hrs. (FLTM BI 104-01) There was no water blistering, dulling or color change for all colors. Also, there was no adhesion loss. | PASS |
| 3.8.4 | MAR & SCRATCH RESISTANCE (FLTM BN 108-04) The coating did not exhibit wear through after 5000 cycles using scuff head "A" with a 0.9 kg load. | PASS |
| 3.8.5 | COLD IMPACT, 90% min. (FLTM B017-02) | PASS |

| | Lapis Blue | Medium Graphite | Saddle | Willow |
|---|---|---|---|---|
| Impact Resistantce | 98% | 110% | 106% | 103% |

| | | |
|---|---|---|
| 3.8.6 | INTERCOAT ADHESION (FLTM BO 17-02) Rated grade 0 using 3M #898-2 tape for all colors. | PASS |
| 3.8.7 | ABRASION RESISTANCE (FLTM BN 108-02, CS#10 wheels, 500 g load) There was no exposure of the base substrate after 700 cycles per 25 micrometers. Note: The test was run on smooth plaques. | PASS |
| 3.8.8 | RESISTANCE TO WATER & SOAP SPOTTING (FLTM BI 113-01) There was no film softening on either spot. There was slight dulling on the soap spot. Discoloration was 5 on the AATCC scale for all colors. | PASS |
| 3.8.9 | CLEANING SOLUTION RESISTANCE, 10 cycles min | PASS |

There was no more color transfer than rating 3 on the AATCC color transference scale:

| AATCC | Lapis | Medium Graphite | Saddle | Willow |
|---|---|---|---|---|
| Glass Cleaner (E4A2-19C507-AA) | 4 | 4 | 4 | 4 |
| All Purpose (EOAZ-19526-AA) | 4 | 4 | 4 | 5 |
| 50% IPA | 4 | 4 | 4 | 4 |

| | | |
|---|---|---|
| 3.8.10 | FOGGING RESISTANCE, 60% min (FLTM BO 116-03) | PASS |

There was no formation of excessive amounts of clear film or droplets.

| | Lapis Blue | Medium Graphite | Saddle | Willow |
|---|---|---|---|---|
| FOG NUMBER | 97% | 90% | 89% | 90% |

| | | |
|---|---|---|
| 3.8.11 | HEAT AGING | PASS |

There was no evidence of tackiness, staining, or color change in excess of 3 on the AATCC scale for all colors.

| | | |
|---|---|---|
| 3.8.12.2 | ACCELERATED WEATHERING | PASS |

Delta E = 1.7 +/- 0.2 maximium.
Gloss Change = 30% maximum.

| | Lapis Blue | Medium Graphite | Saddle | Willow |
|---|---|---|---|---|
| Delta E: 400 h Carbon WOM (FLTM DO 1-1) | 1.01 | 0.22 | 0.56 | 0.27 |
| 488.8 kJ Xenon (SAE J1885) | 0.85 | 0.66 | 0.63 | 0.70 |
| Delta Gloss: 400 h Carbon WOM | 28% | 29% | 27% | 28% |
| 488.8 kJ Xenon | 26% | 29% | 28% | 28% |
| From | 1.9 | 3.1 | 2.8 | 3.2 |
| To | 1.4 | 2.2 | 2.0 | 2.3 |

After the above listed weathering tests, each panel was tested to 24 hours water immersion. All passed with no blistering, dulling or loss of adhesion.

Test Results From WSK-M2P161-A2 Not Covered In WSB-M62J28-A:

| | | |
|---|---|---|
| 3.6 | ENVIRONMENTAL CYCLING (FLTM BQ 104-07, Procedure 5) There was no evidence of cracks, no blistering, no change in appearance or other failure for all colors. There was no adhesion loss. | PASS |
| 3.7 | HEAT RESISTANCE (7 d at 80 +/- 2° C.) There was no color change, blistering or loss of adhesion for all colors. | PASS |
| 3.12 | CROCKING TEST (FLTM BN 107-01) | PASS |

| AATCC | Lapis Blue | Medium Graphite | Saddle | Willow |
|---|---|---|---|---|
| Wet | 5 | 5 | 5 | 5 |
| Dry | 4 | 5 | 5 | 4 |

What is claimed is:

1. A one-coat, non-plasticized coating composition consisting essentially of

A) dispersed particulates of chlorinated polyolefin resin dispersed in an aqueous medium, said chlorinated polyolefin resin being free of carboxylic acid functionality, and B) separate dispersed particulates of an acrylic resin dispersed in said aqueous medium, said acrylic resin having carboxylic acid functionality so as to provide an acid number between about 10 and about 250 and a $T_g$ of at least about 10° C., said chlorinated polyolefin resin comprising between about 35 and about 65 wt % of the total of said chlorinated polyolefin resin plus said acrylic resin, and said acrylic resin comprising between about 35 and about 65 wt % of the total of said chlorinated polyolefin resin plus said acrylic resin C) between about 0.01 and about 5 phr based on total of A) plus B) of a cross-linking agent selected from the group consisting of carbodiimide and oxazoline-functional polymer emulsion, and D) between about 3 and about 25 phr of a volatile organic component for promoting film-forming.

2. A coating composition in accordance with claim 1 further comprising between about 20 and about 100 phr pigment.

3. A coating composition in accordance with claim 1 wherein said cross-linking agent is carbodiimide.

4. A coating composition in accordance with claim 1 wherein said cross-linking agent is oxazoline-functional polymer emulsion.

5. A coating composition in accordance with claim 1 wherein said chlorinated polyolefin is chlorinated polypropylene.

* * * * *